United States Patent
Hamidi-Sepehr et al.

(10) Patent No.: US 11,102,802 B2
(45) Date of Patent: Aug. 24, 2021

(54) CROSS TRANSMISSION OPPORTUNITY (TXOP) SCHEDULING

(71) Applicant: Apple Inc., Cupertino, CA (US)

(72) Inventors: Fatemeh Hamidi-Sepehr, Santa Clara, CA (US); Jeongho Jeon, San Jose, CA (US); Qiaoyang Ye, Fremont, CA (US); Abhijeet Bhorkar, Fremont, CA (US); Hwan-Joon Kwon, Santa Clara, CA (US); Huaning Niu, San Jose, CA (US); Seok Chul Kwon, San Jose, CA (US)

(73) Assignee: APPLE INC., Cupertino, CA (US)

( * ) Notice: Subject to any disclaimer, the term of this patent is extended or adjusted under 35 U.S.C. 154(b) by 209 days.

(21) Appl. No.: 16/069,853

(22) PCT Filed: Oct. 28, 2016

(86) PCT No.: PCT/US2016/059511
§ 371 (c)(1),
(2) Date: Jul. 12, 2018

(87) PCT Pub. No.: WO2017/136009
PCT Pub. Date: Aug. 10, 2017

(65) Prior Publication Data
US 2019/0021105 A1    Jan. 17, 2019

Related U.S. Application Data

(60) Provisional application No. 62/291,426, filed on Feb. 4, 2016.

(51) Int. Cl.
*H04W 72/12* (2009.01)
*H04W 72/14* (2009.01)

(52) U.S. Cl.
CPC ....... *H04W 72/1268* (2013.01); *H04W 72/14* (2013.01)

(58) Field of Classification Search
CPC ............. H04W 16/14; H04W 74/0808; H04W 72/0446; H04W 72/042; H04W 72/14; H04W 72/1289; H04W 72/1268
See application file for complete search history.

(56) References Cited

U.S. PATENT DOCUMENTS

2015/0049712 A1 * 2/2015 Chen ................. H04W 72/1215
370/329
2015/0131536 A1    5/2015 Bala et al.
(Continued)

OTHER PUBLICATIONS

CMCC.; "Discussion on Issues Related to UL Channel Access for LAA." 3GPP Draft; R1-155785; vol. RAN WG1, No. Malmo, Sweden; Oct. 5, 2015-Oct. 9, 2015; Retrieved Oct. 4, 2015; http://www.3gpp.org/ftp/Meetings_3GPP_SYNC/RAN1/Docs/; Chapter 2, 2.1 "Discussion in Challenges on UL Self Carrier Scheduling" 2.2 "Discussion on Challenges of UL Cross-Carrier Scheduling."
(Continued)

*Primary Examiner* — Asad M Nawaz
*Assistant Examiner* — Najeeb Ansari

(57) ABSTRACT

Technology for a user equipment (UE) operable to process scheduled uplink (UL) transmissions is disclosed. The UE can process one or more uplink (UL) grants received from an eNodeB on a downlink (DL) subframe in a first transmission opportunity (TxOP). The UE can determine, based on the one or more UL grants, one or more UL subframes in at least one subsequent TxOP for an UL transmission from the UE. The UE can process the UL transmission for communication on the one or more UL subframes in the at least one subsequent TxOP.

21 Claims, 9 Drawing Sheets

(56) References Cited

U.S. PATENT DOCUMENTS

| | | | | |
|---|---|---|---|---|
| 2016/0381589 | A1* | 12/2016 | Zhang | H04L 5/001 370/252 |
| 2017/0202022 | A1* | 7/2017 | Chendamarai Kannan | H04W 72/0446 |
| 2018/0020375 | A1* | 1/2018 | Matsumoto | H04W 28/06 |
| 2018/0063824 | A1* | 3/2018 | Kim | H04W 72/04 |
| 2018/0077699 | A1* | 3/2018 | Matsumoto | H04L 1/1812 |
| 2018/0288805 | A1* | 10/2018 | Bhorkar | H04L 5/0048 |
| 2018/0359807 | A1* | 12/2018 | Kim | H04W 74/04 |

OTHER PUBLICATIONS

Fujitsu.; "Evaluation of Some Sensing Options for UL LBT." 3GPP Draft; R1-155155; vol. RAN WG1, No. Malmo, Sweden; Oct. 5, 2015-Oct. 9, 2015; Retrieved on Oct. 4, 2015; http://www.3gpp.org/ftp/Meetings_3GPP_SYNC/RAN1/Docs/; Chapter 2, "eNB-sensing based UL LBT and U-sensing based UL LBT." 4 Pages.

Nokia Networks.; "On DL/UL Burst and Subframe Indication for LAA." 3GPP Draft; R1-157133; vol. RAN WG1; Nov. 5, 2015-Nov. 22, 2015; Retrieved Nov. 15, 2015; http://www.3gpp.org/ftp/Meetings_3GPP_SYNC/RAN1/Docs/; Chapter 3, "Signalling Arrangement UL Burst Indicator.".

PCT. Application No. PCT/US2016/059511; filing date Oct. 28, 2016, Fatemeh Hamidi-Sephr, International Search Report; dated Feb. 2, 2017, 12 Pages.

* cited by examiner

CROSS TRANSMISSION OPPORTUNITY (TXOP) SCHEDULING

RELATED APPLICATIONS

The present application claims priority to U.S. Provisional Patent Application No. 62/291,426, filed Feb. 4, 2016, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
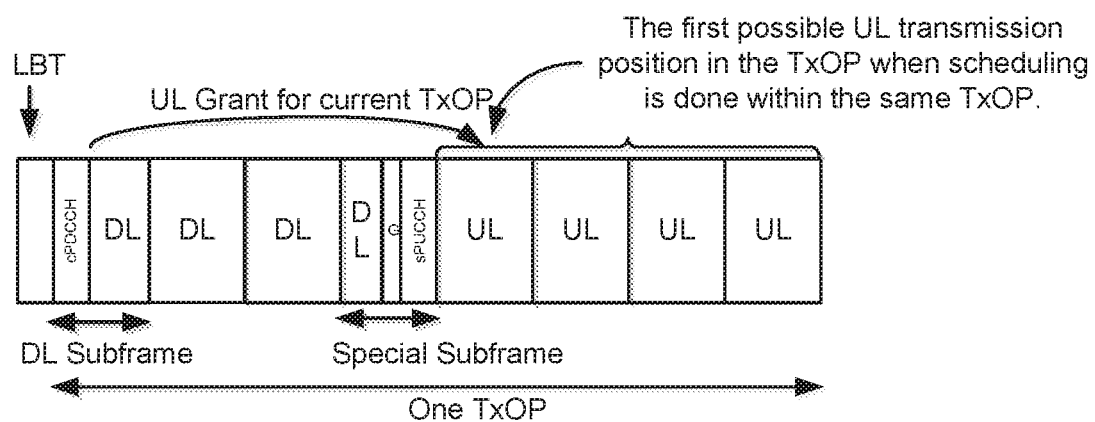
FIG. 1 illustrates uplink (UL) scheduling within a transmission opportunity (TxOP) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The explosive growth in wireless traffic has led to a demand for rate improvement. However, with mature physical layer techniques, further improvement in spectral efficiency has been marginal. In addition, the scarcity of licensed spectrum in the low frequency band results in a deficit in the data rate boost. There are emerging interests in the operation of LTE systems in unlicensed spectrum. In 3GPP LTE Release 13, one enhancement has been to enable operation in the unlicensed spectrum via licensed-assisted access (LAA). LAA can expand the system bandwidth by utilizing a flexible carrier aggregation (CA) framework, as introduced in the LTE-Advanced system (3GPP LTE Release 10 system). Release 13 LAA focuses on the downlink (DL) design, while Release14 enhanced LAA (or eLAA) focuses on the uplink (UL) design. Enhanced operation of LTE systems in the unlicensed spectrum is expected in Fifth Generation (5G) wireless communication systems. In one example, LTE operation in the unlicensed spectrum can be achieved using dual connectivity (DC) based LAA. In DC based LAA, an anchor deployed in the licensed spectrum can be utilized. In another example, Release 14 describes that LTE operation in the unlicensed system can be achieved using a MuLTEfire system, which does not utilize an anchor in the licensed spectrum. The MuLTEfire system is a standalone LTE system that operates in the unlicensed spectrum. Therefore, Release 14 eLAA and MuLTEfire systems can potentially be significant evolutions in future wireless networks.

In one example, the unlicensed frequency band of current interest for 3GPP systems is the 5 gigahertz (GHz) band, which has wide spectrum with global common availability. The 5 GHz band in the United States is governed using Unlicensed National Information Infrastructure (U-NII) rules by the Federal Communications Commission (FCC), and the 5 GHz band is governed by the European Telecommunications Standards Institute (ETSI) in Europe. The main incumbent system in the 5 GHz band is the wireless local area networks (WLAN), specifically those based on the IEEE 802.11 a/n/ac technologies. WLAN systems are widely deployed both by individuals and operators for carrier-grade access service and data offloading.

Therefore, listen-before-talk (LBT) in the unlicensed spectrum is a mandatory feature in the Release 13 LAA system, which can enable fair coexistence with the incumbent system. LBT is a procedure in which radio transmitters first sense the medium, and transmit only if the medium is sensed to be idle. LBT can be performed at either the eNodeB or the UE prior to a transmission.

In Release 13 LAA, UL performance in the unlicensed spectrum can be significantly degraded, and one reason for this UL starvation can be due to the LBT procedures that are doubly performed at both the eNodeB when sending the UL grant, as well as at the scheduled UEs before a transmission. This is a generic problem that occurs when a scheduled system, e.g., LTE, coexists with a non-scheduled autonomous system, e.g., Wi-Fi. In addition, a particular limitation imposed on the LTE system is the 4-subframe processing delay, which restricts that an initial 4 subframes in a transmission burst cannot be configured to UL as the UL grants are unavailable for those subframes within the same transmission burst.

More specifically, in previous solutions, UL scheduling is currently limited within a same TxOP, which can degrade UL performance due to the 4-subframe delay limitation. In other words, due to the LTE processing delay for encoding a physical uplink shared channel (PUSCH), the first four subframes within the TxOP cannot be scheduled as UL by the preceding DL subframes in the same TxOP. For example, if the TxOP is limited to 6 msec, then at most two subframes can be configured for the UL transmission. Generally speaking, at most two subframes can be used for the UL transmission. However, in the case that partial subframes are supported, only one subframe can be used for the UL transmission depending on whether a considered partial subframe is also capable of scheduling or not.

Therefore, cross-TxOP UL scheduling, as discussed in further detail below, can mitigate the UL starvation issue and increase UL transmission opportunities by allowing the UL subframes in one transmission opportunity (TxOP) (or transmission burst) to be scheduled in preceding TxOPs. Cross-TxOP UL scheduling can schedule potential UL subframes in a preceding TxOP (or transmission burst) and allow the UL transmission to begin earlier within the TxOP (as compared to previous solutions). Cross-TxOP UL scheduling can be applicable to MuLTEfire and eLAA technologies to improve the UL performance by overcoming the delay limitation between the UL grant and the UL transmission opportunity. Cross-TxOP UL scheduling can be especially useful when an LTE system has relatively short TxOPs (e.g., 6 msec or 8 msec), or when the LTE system is experiencing a relatively large amount of UL traffic since a more flexible DL/UL frame configuration is allowed.

In one configuration, cross-TxOP UL scheduling can be applicable for MuLTEfire and eLAA systems. UL grants from a current TxOP can schedule UL subframe(s) of a future TxOP. For example, one UL grant on a DL subframe can schedule one UL subframe in a following TxOP. In another example, one UL grant on a DL subframe can schedule multiple UL subframes in a following TxOP. In yet another example, one or more UL grants on a DL subframe can schedule multiple UL subframes in subsequent TxOP(s).

In one configuration, the eNodeB that performs the cross-TxOP UL scheduling can indicate various types of information to the UE. For example, the eNodeB can indicate a number of contiguous subframes for an UL transmission, an offset from a last DL subframe, an offset from a start of a TxOP, positions of allocated subframes with respect to an inconsecutive assignment, an indication of the TxOP with respect to multiple TxOP scheduling, etc.

In one configuration, in order to handle UE confusion when a physical downlink control channel (PDCCH) such as a common PDCCH (cPDCCH) (or an enhanced PDCCH (ePDCCH)) indicating a following start of the TxOP is missed at the UE, proper signaling can be provided to the UE. For example, an explicit TxOP ID or one or more toggling bits can be added to the cPDCCH or an UL grant to enable the UE to distinguish between TxOPs. As another example, a subframe ID and/or a remaining number of subframes within the TxOP can be indicated to the UE.

FIG. 1 illustrates an example of uplink (UL) scheduling within a transmission opportunity (TxOP). The TxOP can refer to a certain duration of time that an initiating node (e.g., UE or eNodeB) obtains ownership of channel time, during which the initiating node can perform a transmission. The TxOP can include a plurality of downlink (DL) subframes, UL subframes and/or special subframes. A guard band can separate the DL subframes from the UL subframes within the TxOP.

In one example, the eNodeB can perform a listen-before-talk (LBT) procedure at a start of the TxOP. After LBT is performed, the eNodeB can allocate an UL grant for the UE within the TxOP. The UL grant can be transmitted to the UE in a DL subframe via a physical downlink control channel (PDCCH). The UL grant can schedule an UL transmission to be performed by the UE, and the UL transmission can be scheduled four subframes after the UL grant is transmitted to the UE within the same TxOP. In one example, the UL grant can schedule a single UL subframe for the UL transmission, or alternatively, the UL grant can schedule multiple UL subframes for the UL transmission. At a later point in time within the TxOP (e.g., four subframes later due to a subframe processing delay), the UE can perform the UL transmission on one or more UL subframes within the TxOP in accordance with the UL grant received from the eNodeB.

Figure 2:
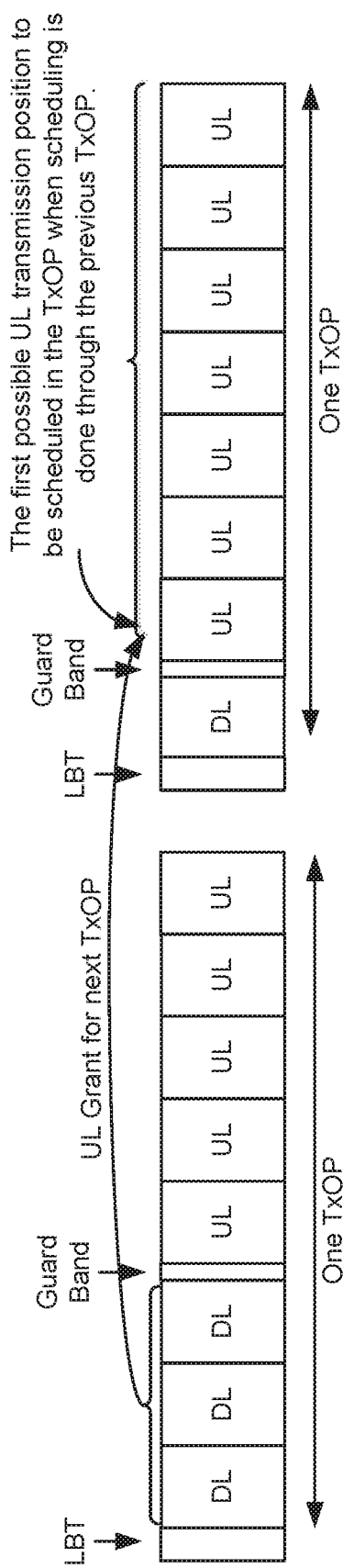
FIG. 2 illustrates uplink (UL) scheduling across multiple transmission opportunities (TxOPs) in accordance with an example.

FIG. 2 illustrates an example of uplink (UL) scheduling across multiple transmission opportunities (TxOPs). For example, the UL scheduling can be performed by an eNodeB for a user equipment (UE), and the UL scheduling can be performed across a first TxOP and a second TxOP (e.g., a given TxOP and a TxOP that follows the given TxOP). In other words, the first TxOP can be prior to the second TxOP, and the second TxOP can be subsequent to the first TxOP. In some cases, the second TxOP can be immediately after the first TxOP. In general, a TxOP can refer to a certain duration of time that an initiating node (e.g., UE or eNodeB) obtains ownership of channel time, during which the initiating node can perform a transmission. Each TxOP can include a plurality of downlink (DL) subframes, UL subframes and/or special subframes. A guard band can separate the DL subframes from the UL subframes within a given TxOP.

In one example, the eNodeB can perform a first listen-before-talk (LBT) procedure at a start of the first TxOP. After LBT is performed, the eNodeB can allocate an UL grant for the UE within the first TxOP. The UL grant can be transmitted to the UE in a DL subframe via a physical downlink control channel (PDCCH). The UL grant can schedule an UL transmission to be performed by the UE, and the UL transmission can be scheduled for a next TxOP, such as the second TxOP. In other words, rather than scheduling the UL transmission to be performed by the UE within the same TxOP, the eNodeB can schedule the UL transmission to be performed by the UE within a next second TxOP.

In one example, the UL grant can schedule a single UL subframe for the UL transmission, or alternatively, the UL grant can schedule multiple UL subframes for the UL transmission. As shown in FIG. 2, by scheduling the UL transmission to be performed by the UE within the second TxOP (or next TxOP), an increased number of UL subframes are available for the UL transmission (as compared to if the UL transmission was scheduled to be performed within the first TxOP, i.e., the same TxOP).

Prior to a start of the second TxOP, the eNodeB can perform a second LBT procedure. The second LBT procedure can be followed by at least one DL subframe in the second TxOP, and then one or more UL subframes in the second TxOP. The UE can perform the UL transmission on one or more UL subframes within the second TxOP (e.g., the next TxOP) in accordance with the UL grant received from the eNodeB during the first TxOP (e.g., a prior TxOP). In other words, the UL transmission that is performed by the UE during a TxOP can be scheduled by the eNodeB in a previous TxOP.

In one configuration, with respect to cross-TxOP scheduling, an eNodeB can utilize various mechanisms to indicate which subframe is assigned to each UE. For example, in single-subframe scheduling, the eNodeB can send an UL grant on a DL subframe in a current TxOP, which can schedule one UL subframe for the UE in a following TxOP. The UE can utilize the scheduled UL subframe to perform an UL transmission.

In an alternative configuration, in multi-subframe scheduling, the eNodeB can send one UL grant on a DL subframe in order to schedule multiple UL subframes for the UE. For example, in single-TxOP scheduling, one UL grant from the eNodeB on a DL subframe can schedule multiple UL subframes for the UE in a subsequent TxOP, e.g., a next TxOP. In another example, in multi-TxOP scheduling, one UL grant from the eNodeB on a DL subframe can schedule multiple UL subframes in multiple subsequent TxOPs. The number of subsequent TxOPs that can be scheduled with one UL grant in a current TxOP can vary depending on the type of UL grant. As a non-limiting example, one UL grant in a current TxOP can schedule two subsequent TxOPs for the UE.

In one example, an UL grant from the eNodeB can schedule a next TxOP partially, or the UL grant can schedule all UL subframes within the next TxOP. In another example, one UL grant or multiple UL grants from the eNodeB can be used to schedule multiple subframes for an UL transmission to be performed by the UE(s).

In one example, a combination of within-TxOP scheduling and cross-TxOP scheduling can be utilized. For example, for the subframes satisfying the (n+4) delay requirement, a PUSCH can be transmitted within a current TxOP, wherein n represents a subframe number. The remaining subframes can be scheduled to be transmitted in a next TxOP (or potentially in a second next TxOP).

In one configuration, in Release 13 LAA, the cPDCCH or UL grant can explicitly indicate an end of a TxOP (or transmission burst). In addition, the cPDCCH or UL grant can explicitly indicate a start of the TxOP (or transmission burst), which enables the UE to determine a length of the TxOP (or transmission burst). Since the cPDCCH is transmitted in every DL subframe, the cPDCCH can include an indication of the start of the TxOP and the end of the TxOP. Thus, an UL transmission performed by the UE can be preceded by a DL transmission performed by the eNodeB. In addition, transmissions on unlicensed spectrum are subject to LBT, so the UE can be informed when the eNodeB completes LBT. Since the UE that is scheduled for a next TxOP is waiting for an opportunity to transmit its prepared data, the UE can be informed when the eNodeB completes LBT.

In one configuration, various scheduling/signaling mechanisms can be used for multi-subframe scheduling. For example, an UL grant/cPDCCH can indicate multiple consecutive UL subframes across one or multiple TxOPs. A number of consecutive UL subframes can be indicated by the eNodeB to the scheduled UEs. The UE can determine the allowed UL subframes within each TxOP based on the information contained in the UL grant/cPDCCH. In another example, the eNodeB can indicate an offset (in subframes) from a start of the TxOP over which the UE is to be scheduled. Alternatively, the eNodeB can indicate an offset (in subframes) from a last DL subframe in the TxOP over which the UE is to be scheduled. The different indications, e.g., the offset from the last DL subframe or the start of the TxOP can result in a different number of bits being used for the indications. In another example, the eNodeB can explicitly indicate UL subframe positions in a subsequent TxOP to the UE, and the UL subframe positions can be assigned for an UL transmission to be performed by the UE.

In one configuration, an UL grant/cPDCCH can indicate multiple inconsecutive (distributed) subframes across one or multiple TxOPs. For example, the eNodeB can explicitly indicate the positions of the UL subframes being assigned to the UE. The UE can receive a numbering/ID of the UL subframe(s) in a particular TxOP (e.g., the UE can receive an indication that a particular UL subframe is a second subframe or a third subframe in a particular TxOP). In another example, the eNodeB can provide an indication to the UE for each chunk of consecutive UL subframes. In yet another example, the eNodeB can use a predefined allocation pattern to reduce the signaling overhead. The UE can receive the predefined allocation pattern from the eNodeB, and the UE can determine when to perform an UL transmission based on the predefined allocation pattern.

In one configuration, when within-TxOP scheduling and cross-TxOP scheduling is utilized, the eNodeB can indicate to the UE the number of subframes to be used for the UL transmission. The UE can perform the UL transmission in accordance with a timing of n+4, wherein n represents a subframe number. The UE can transmit and count the number of subframes until the transmission is complete. As an example, an UL grant from a previous TxOP can schedule an UL transmission spanning 5 subframes. In accordance with the n+4 subframe processing delay, 3 subframes can be used for the UL transmission in a current TxOP, and the remaining two subframes can be the 2 first UL subframes in next TxOP(s). As another example, the eNodeB can indicate which subframes within a current TxOP and subframes cross-TxOP are to be used for an UL transmission. The eNodeB can indicate the specific subframes based on a subframe offset and/or information on the positions of the UL subframes being assigned to the UE In one example, the UE can miss a start of a TxOP (or transmission burst). For example, multiple subframes from two TxOPs can be scheduled for the UE. The UE can transmit in the first two UL subframes in a current TxOP. Although the UE is to transmit in remaining subframes in a next TxOP, the UE can miss the start of the next TxOP. In order to ensure that the UE determines that the start of the next TxOP has been missed, and to prevent the UE from transmitting in a wrong opportunity, the eNodeB can signal a TxOP number/ID to the UE. The TxOP number/ID can be associated with the current TxOP, and the TxOP number/ID can be sent for each TxOP. By sending the TxOP number/ID, the eNodeB can ensure that the UE is capable of handling a situation in which a start of the TxOP is missed. In other words, when the UE detects the TxOP number/ID of the next TxOP, the UE can transmit in the remaining subframes.

In one example, the UE can miss a first cPDCCH or a first few cPDCCHs in one or more DL subframes during a TxOP. In this case, the UE can misinterpret an offset within the TxOP and transmit on incorrect UL subframes. Thus, the eNodeB can indicate a remaining number of subframes within the TxOP to the UE, or the eNodeB can indicate a subframe number/ID within the TxOP to the UE. Even when the UE misses the first cPDCCH or the first few cPDCCHs in the TxOP, the UE can determine the remaining number of subframes within the TxOP.

In one example, with respect to multi-user scheduling, a UE can miss the cPDCCH and there is no information in a following cPDCCH that enables the UE to determine it has missed a previous grant indication. For example, the following cPDCCH can only indicate an offset from an end of the TxOP. In this case, the UE can start an UL transmission based on an UL grant indicated in a following cPDCCH, but this UL grant can be intended for another UE. In other words, after missing an initial opportunity to perform the UL transmission, the UE can mistakenly perform the UL transmission during a subsequent opportunity in a subsequent TxOP that is intended for use by another UE. Therefore, the eNodeB can send toggling bits in a cPDCCH or UL grant, which can enable the UE to determine a missed cPDCCH. The usage of the toggling bits can prevent the UE from performing the UL transmission during the subsequent TxOP, which can interfere with another scheduled UL transmission during the same subsequent TxOP.

In one configuration, the eNodeB can provide the UE with various types of signaling to improve the reliability and performance for cross-TxOP UL scheduling. For example, the eNodeB can include an explicit TxOP ID in signaling via the cPDCCH. As previously described, the cPDCCH can be transmitted in every DL subframe of the TxOP. The eNodeB can indicate to the UE a subframe ID within the TxOP. The eNodeB can indicate to the UE a remaining number of subframes within the TxOP, and the remaining number of subframes within the TxOP can be indicated via the cPDCCH. The eNodeB can include one or more toggling bits to the cPDCCH to enable the UE to distinguish between different TxOPs. The toggling bits can enable the UE to determine when a previous cPDCCH has been missed. In addition, when the UE misses a first cPDCCH or misses a start of the TxOP, cross-TxOP scheduling can be voided when a following TxOP is more than N msec outdated, wherein N can depend on UL performance.

In one example, an UL grant that is transmitted to schedule an UL transmission in one or more TxOPs can be referred to as a two-stage grant. A first grant can indicate information that enables the UE to construct a packet data unit (PDU). A second grant can be a one-bit triggering message that instructs the UE, upon detection of a cPDCCH that contains the one-bit triggering message in the cPDCCH, to start an UL transmission (as indicated in the first grant).

In one example, the UL grant that is transmitted to the UE can include N, wherein N can represent a validity timer (in msec). The value of N can be indicated in cross TxOP scheduling downlink control information (DCI). After a period of N (e.g., 8 msec), the UE can discard the UL grant. In other words, after receiving the cPDCCH which indicates an UL burst duration, if an UL transmission is within the indicated UL burst duration and if the UL transmission is within the validity timer (N), then the UE can perform the UL transmission. Otherwise, the UE can discard the UL transmission. The UL transmission can be discarded after the validity timer (N) expires. In other words, the UE can discard the cross TxOP scheduling information after N msec.

In one example, the UE can determine that a start of a TxOP has been missed, and that the UE has already transmitted a part of its UL data. In another example, the UE can determine that a cPDCCH has been missed. In these examples, the UE can reset and assume that a previous assignment is now invalid, or the UE can wait for its next assigned resources and continue transmitting in remaining UL subframes.

Figure 3:
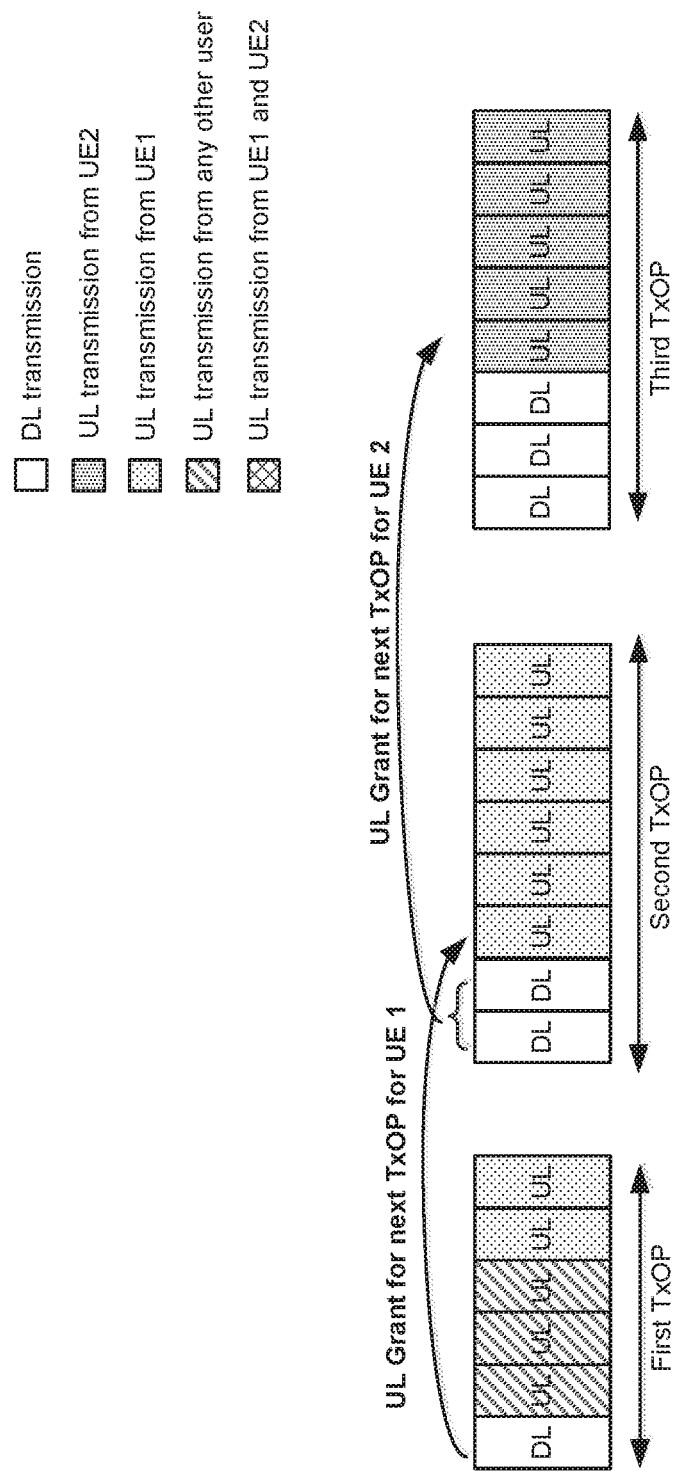
FIG. 3 illustrates uplink (UL) scheduling across multiple transmission opportunities (TxOPs) for multiple user equipments (UEs) in accordance with an example.

FIG. 3 illustrates an example of uplink (UL) scheduling across multiple transmission opportunities (TxOPs) for multiple user equipments (UEs). As shown in FIG. 3, an eNodeB can send a first UL grant in a DL subframe of a first TxOP. The first UL grant can schedule a group of UL subframes for a first UE in a second TxOP (or next TxOP). In other words, the eNodeB can perform cross-TxOP UL scheduling for the first UE. The first UE can perform an UL transmission during the second TxOP based on the first UL grant received from the eNodeB.

In addition, the eNodeB can send a second UL grant in a DL subframe of the second TxOP. The second UL grant can schedule a group of UL subframes for a second UE in a third TxOP. In other words, the eNodeB can perform cross-TxOP UL scheduling for the first UE. The second UE can perform an UL transmission during the third TxOP based on the second UL grant received from the eNodeB.

Figure 4:
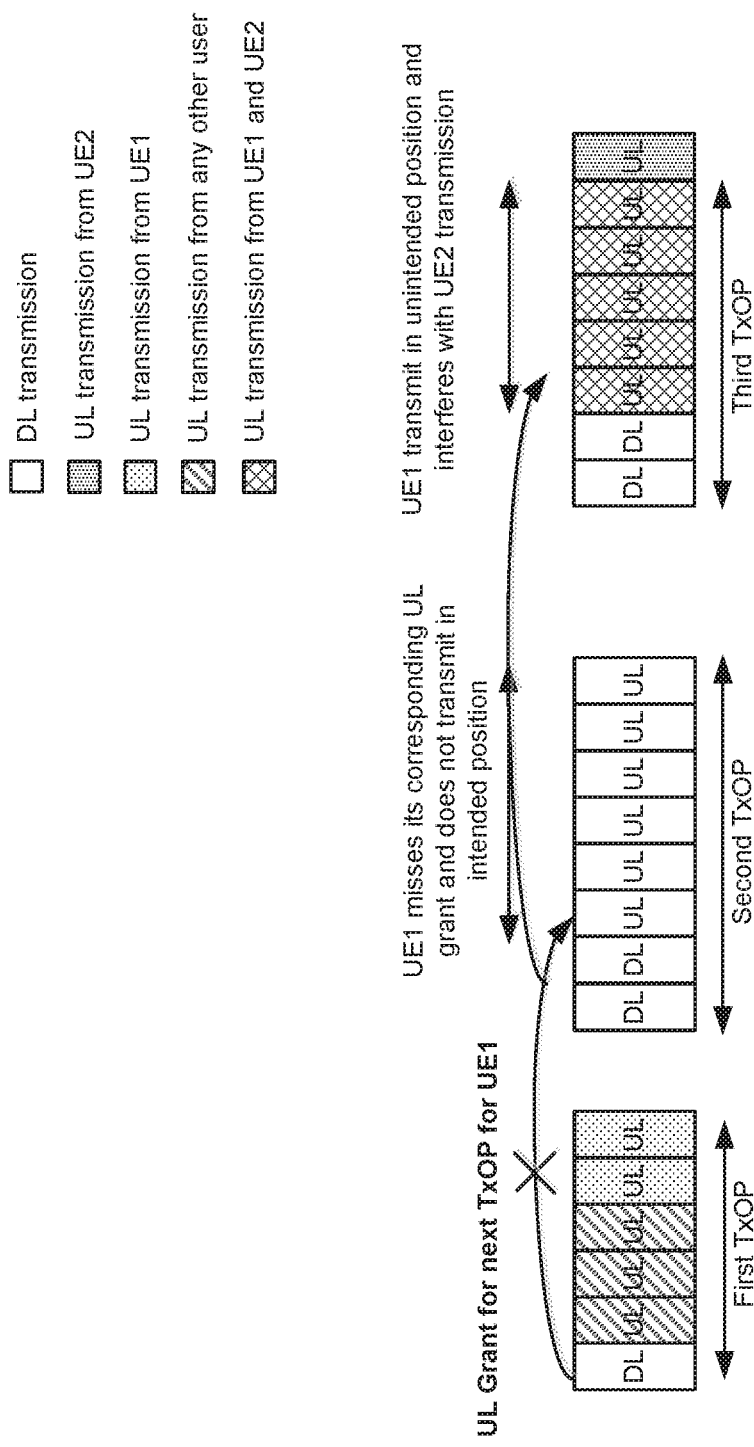
FIG. 4 illustrates potential problems in uplink (UL) scheduling across multiple transmission opportunities (TxOPs) for multiple user equipments (UEs) in accordance with an example.

FIG. 4 illustrates an example of potential problems in uplink (UL) scheduling across multiple transmission opportunities (TxOPs) for multiple user equipments (UEs). As shown in FIG. 4, an eNodeB can send a first UL grant in a DL subframe of a first TxOP. The first UL grant can schedule a group of UL subframes for a first UE in a second TxOP. However, improper signaling of the first UL grant may cause the first UE to not receive the first UL grant from the eNodeB. While it may be possible, the first UE may not perform an UL transmission during the second TxOP based on the first UL grant.

In this example, the first UL grant can be sent via a common PDCCH (cPDCCH). Here, the first TxOP only includes one DL subframe. So although the cPDCCH can be transmitted in every DL subframe, since the first TxOP only includes the one DL subframe, there is no opportunity to transmit the cPDCCH again during the first TxOP. As a result, the first UE does not perform the UL transmission during the second TxOP.

In addition, the eNodeB can send a second UL grant in a DL subframe of the second TxOP. The second UL grant can schedule a group of UL subframes for a second UE in a third TxOP. The second UE can perform an UL transmission during the third TxOP based on the second UL grant received from the eNodeB. However, since the first UE missed an opportunity to perform the UL transmission during the second TxOP, the first UE may instead perform the UL transmission during the third TxOP. As a result, the UL transmission from the first UE during the third TxOP can interfere with the UL transmission from the second UE during the third TxOP. Therefore, the eNodeB can ensure that proper signaling is performed (e.g., toggling bits to indicate to UEs that a cPDCCH has been missed, as previously described), such that the UEs do not miss UL grants which cause the UEs to improperly perform UL transmissions in later TxOPs and cause interference with previously scheduled UL transmissions during the same TxOPs.

In one configuration, scheduling can be performed for a system operating in an unlicensed spectrum. For example, a scheduling of UL subframes in one transmission opportunity (TxOP), or burst, can be indicated in subframes of a preceding TxOP. In another example, a cPDCCH can be transmitted (or broadcasted) in every DL subframe, and the cPDCCH can carry information to indicate exact UL positions either explicitly or implicitly to the UE. In addition, information regarding a start of the burst and an end of the burst can be inferred by the UE based on the cPDCCH.

In one example, one UL grant on a DL subframe in a current TxOP can schedule one UL subframe in a following TxOP. In another example, one UL grant on a DL subframe in a current TxOP can schedule multiple UL subframes across subsequent TxOP(s).

In one configuration, scheduling can be performed for a system operating in an unlicensed spectrum, and the scheduling can be a combination of within-TxOP scheduling and cross-TxOP scheduling. For example, one UL grant on a DL subframe in a current TxOP can schedule multiple UL subframes across the current TxOP and subsequent TxOP(s). In another example, UL grant(s) in a current TxOP can schedule UL transmissions for subframes of multiple subsequent TxOP(s) or a single subsequent TxOP (in addition to a current TxOP).

In one example, an UL grant can schedule a following TxOP either partially or completely. In another example, an UL grant/cPDCCH can indicate an assignment of multiple consecutive subframes. In yet another example, an UL grant/cPDCCH can indicate an assignment of multiple distributed subframes.

In one example, a number of subframes can be indicated to the UE via the cPDCCH or UL grant, which can enable the UE to determine the number of subframes when starting a transmission, as well as keep track and count the number of subframes during the transmission. The UE can continue transmitting on the available UL subframes until the transmission is complete.

In one example, the eNodeB can indicate (through the cPDCCH/UL grant) an offset from a start of the burst over which the UE is to be scheduled. In addition, the eNodeB can indicate an offset from a last DL subframe). In another example, an UL grant can indicate a position of a subsequent burst that is assigned to the UE (in case of multi-user scheduling, assigned to each UE).

In one example, for subframes that satisfy n+4 delay criteria, a PUSCH can be transmitted within a current TxOP. Remaining subframes can be scheduled to be transmitted in a subsequent TxOP (or in a second subsequent TxOP). In this case, the eNodeB can indicate a number of subframes to the UE. The UE can maintain a timing of n+4, and then the UE transmits and counts the number of subframes until the transmission is complete.

In one example, the eNodeB can indicate locations for the UL transmissions within a current TxOP and subsequent TxOP(s), e.g., a subframe index or subframe offset from a start of a burst in the current and subsequent TxOP(s) can be indicated by the eNodeB to the UE.

In one example, the eNodeB can explicitly indicate positions of the subframes being assigned to the UE. In another example, a predefined allocation pattern can be used to reduce signaling overhead. In yet another example, an indication can be performed for each chunk of consecutive UL subframes. In a further example, explicit TxOP ID signaling can be added in the cPDCCH or UL grant.

In one example, one or more toggling bits can be added to the cPDCCH or UL grant to enable the UE to distinguish between different bursts. In another example, a subframe ID within the burst, or a remaining number of subframes within the burst, can be indicated to the UE. In yet another example, cross-TxOP scheduling can be voided when a following burst is more than N msec outdated, wherein N represents a defined number depending on UL performance.

In one example, when the UE detects that it has missed a start of the burst or the cPDCCH, through proper signaling, and the UE has already transmitted a part of its UL data, the UE can reset and assume that a previous assignment is gone. In another example, when the UE detects that it has missed a start of the burst or the cPDCCH, through proper signaling, and the UE has already transmitted a part of its UL data, the UE can wait for its next assigned resources and continue transmitting its remaining subframes.

Figure 5:
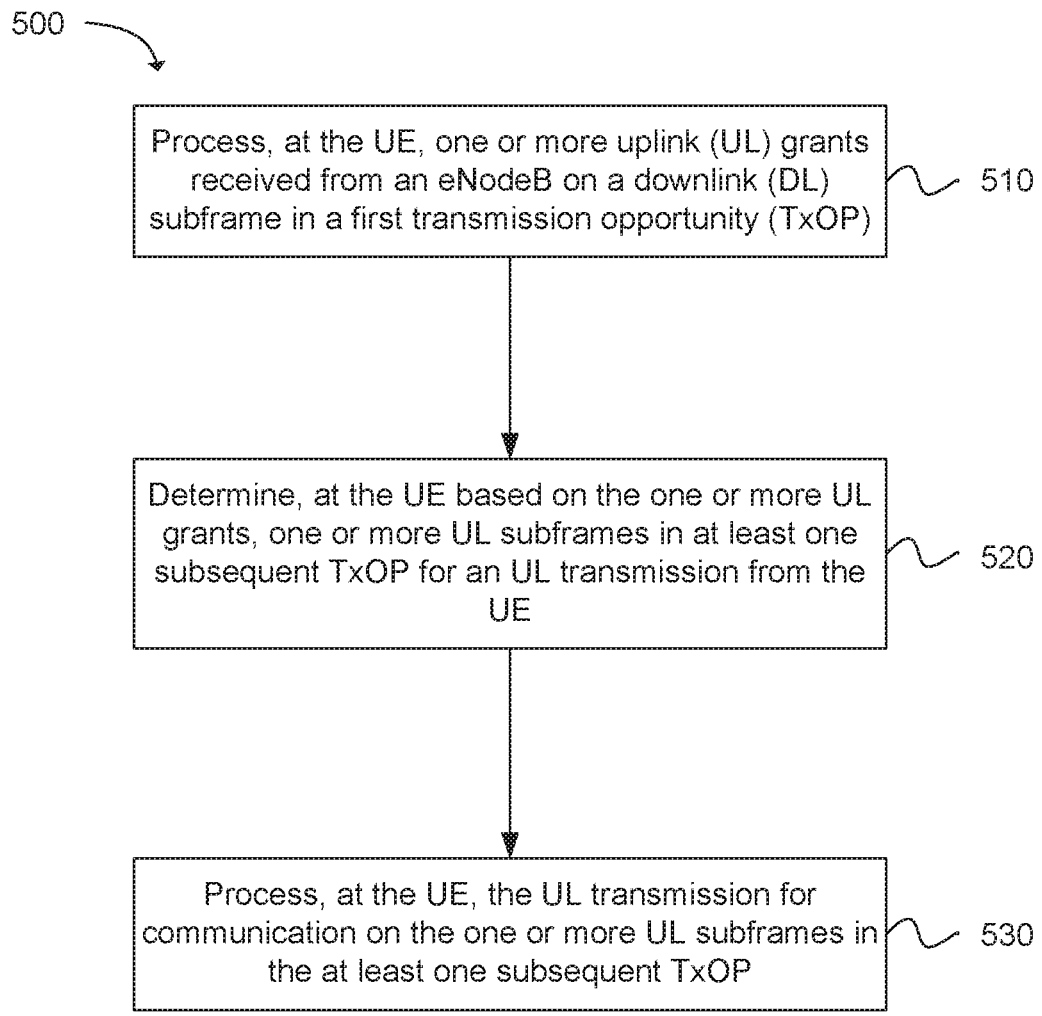
FIG. 5 depicts functionality of a user equipment (UE) operable to process scheduled uplink (UL) transmissions in accordance with an example.

Another example provides functionality 500 of a user equipment (UE) operable to process scheduled uplink (UL) transmissions, as shown in FIG. 5. The UE can comprise one or more processors and memory configured to: process, at the UE, one or more uplink (UL) grants received from an eNodeB on a downlink (DL) subframe in a first transmission opportunity (TxOP), as in block 510. The UE can comprise one or more processors and memory configured to: determine, at the UE based on the one or more UL grants, one or more UL subframes in at least one subsequent TxOP for an UL transmission from the UE, as in block 520. The UE can comprise one or more processors and memory configured to: process, at the UE, the UL transmission for communication on the one or more UL subframes in the at least one subsequent TxOP, as in block 530.

Figure 6:
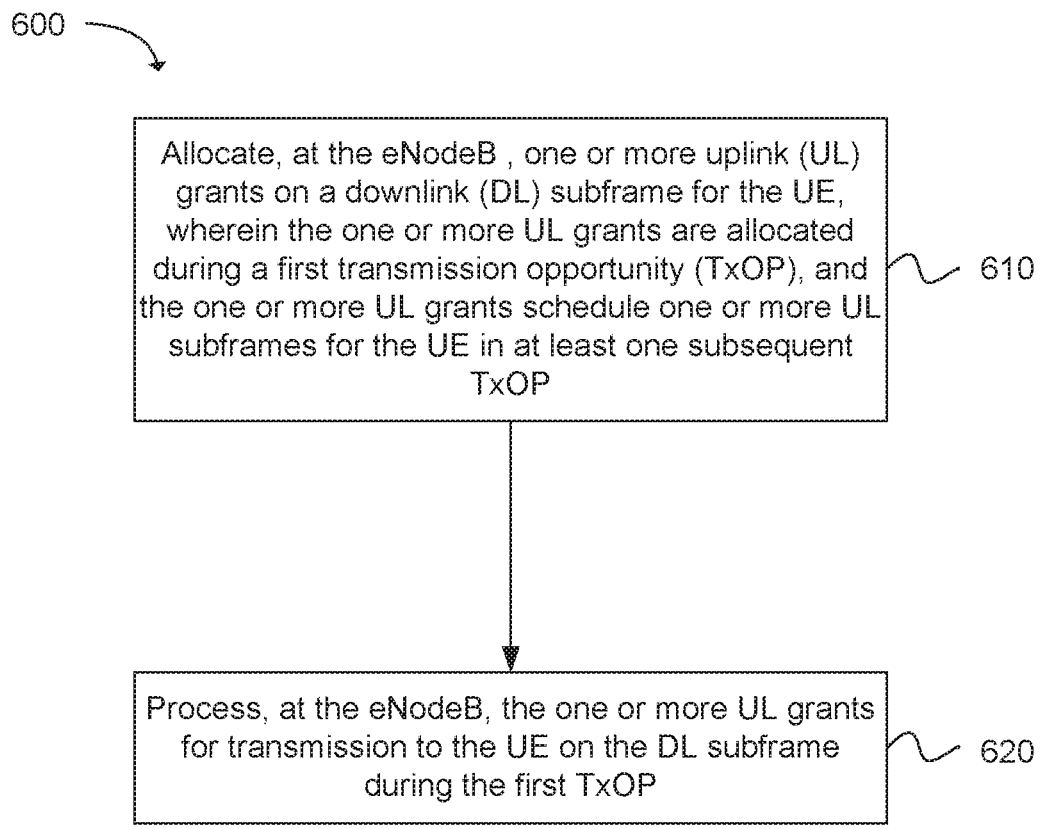
FIG. 6 depicts functionality of an eNodeB operable to perform scheduling for a user equipment (UE) in accordance with an example.

Another example provides functionality 600 of an eNodeB operable to perform scheduling for a user equipment (UE), as shown in FIG. 6. The eNodeB can comprise one or more processors and memory configured to: allocate, at the eNodeB, one or more uplink (UL) grants on a downlink (DL) subframe for the UE, wherein the one or more UL grants are allocated during a first transmission opportunity (TxOP), and the one or more UL grants schedule one or more UL subframes for the UE in at least one subsequent TxOP, as in block 610. The eNodeB can comprise one or more processors and memory configured to: process, at the eNodeB, the one or more UL grants for transmission to the UE on the DL subframe during the first TxOP, as in block 620.

Figure 7:
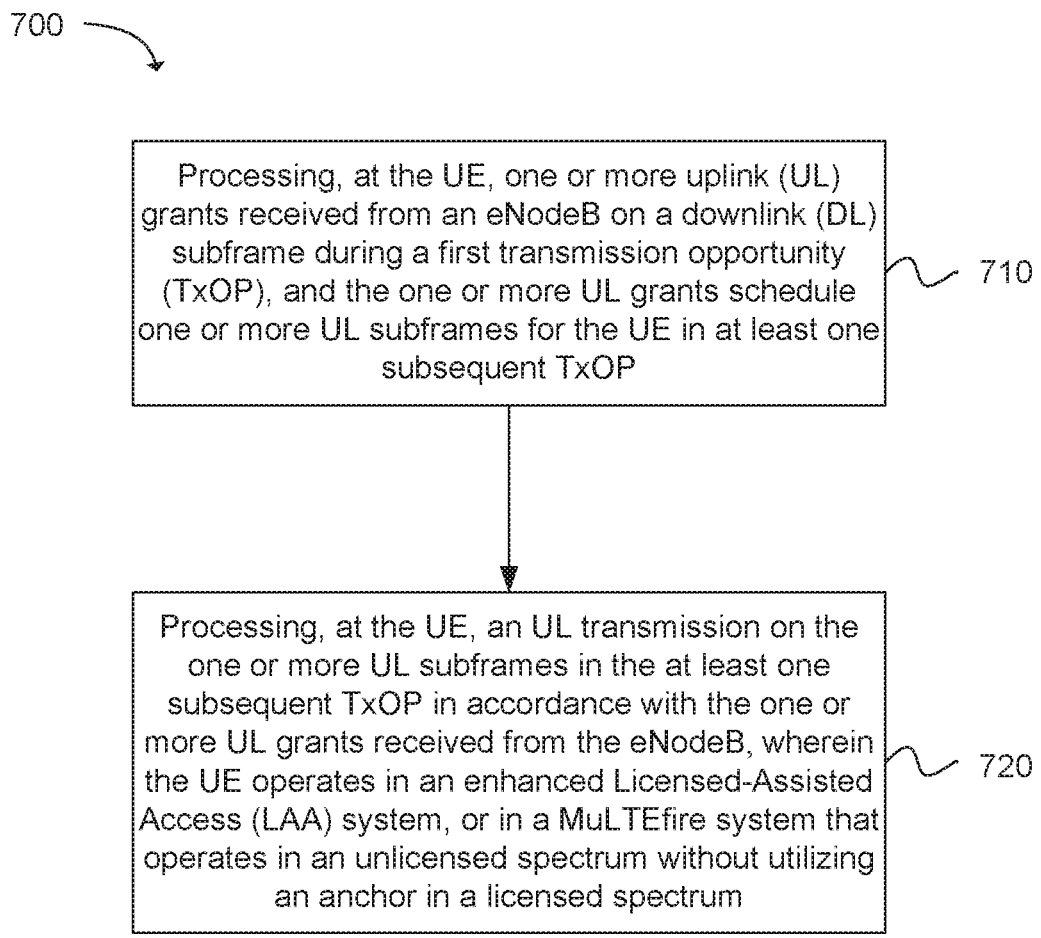
FIG. 7 depicts a flowchart of a machine readable storage medium having instructions embodied thereon for processing scheduled uplink (UL) transmissions at a user equipment (UE) in accordance with an example.

Another example provides at least one machine readable storage medium having instructions 700 embodied thereon for processing scheduled uplink (UL) transmissions at a user equipment (UE), as shown in FIG. 7. The instructions can be executed on a machine, where the instructions are included on at least one computer readable medium or one non-transitory machine readable storage medium. The instructions when executed perform: processing, at the UE, one or more uplink (UL) grants received from an eNodeB on a downlink (DL) subframe during a first transmission opportunity (TxOP), and the one or more UL grants schedule one or more UL subframes for the UE in at least one subsequent TxOP, as in block 710. The instructions when executed perform: processing, at the UE, an UL transmission on the one or more UL subframes in the at least one subsequent TxOP in accordance with the one or more UL grants received from the eNodeB, wherein the UE operates in an enhanced Licensed-Assisted Access (LAA) system, or in a MuLTEfire system that operates in an unlicensed spectrum without utilizing an anchor in a licensed spectrum, as in block 720.

Figure 8:
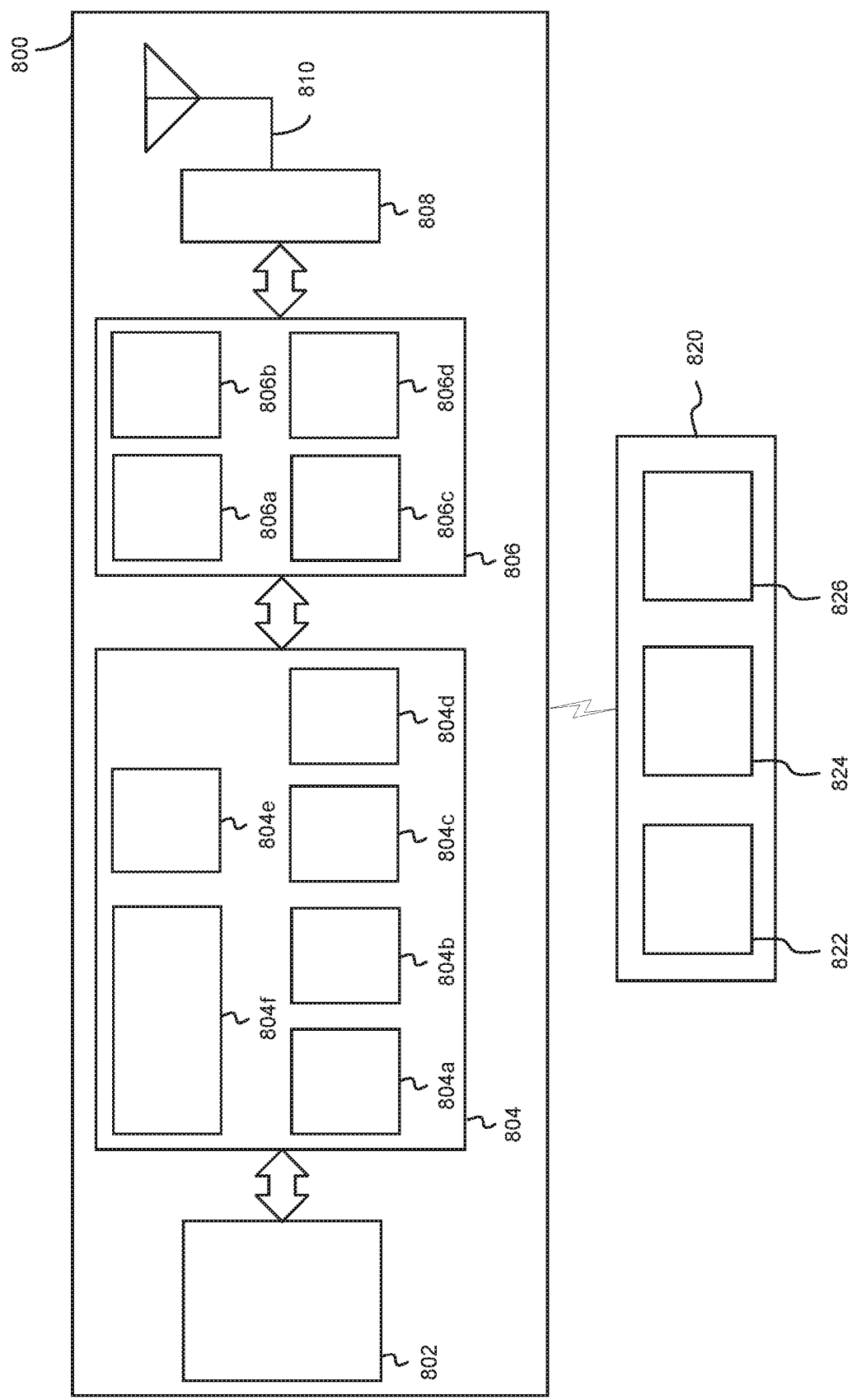
FIG. 8 illustrates a diagram of a wireless device (e.g., UE) and a base station (e.g., eNodeB) in accordance with an example.

FIG. 8 provides an example illustration of a user equipment (UE) device 800 and a node 820. The UE device 800 can include a wireless device, a mobile station (MS), a mobile wireless device, a mobile communication device, a tablet, a handset, or other type of wireless device. The UE device 800 can include one or more antennas configured to communicate with the node 820 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 820 can include one or more processors 822, memory 824 and a transceiver 826. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown. In addition, the node 820 may include, similar to that described for the UE device 800, application circuitry, baseband circuitry, Radio Frequency (RF) circuitry, front-end module (FEM) circuitry and one or more antennas The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.).

The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

Figure 9:
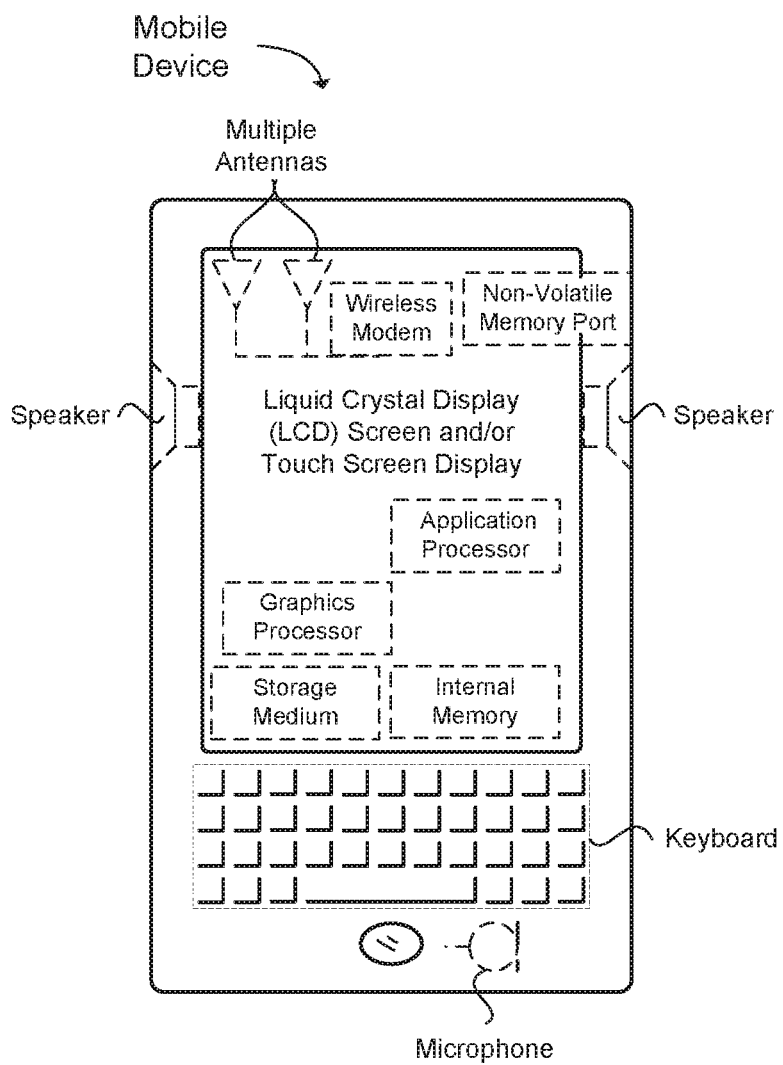
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to process scheduled uplink (UL) transmissions, the apparatus comprising one or more processors and memory configured to: process, at the UE, one or more uplink (UL) grants received from an eNodeB on a downlink (DL) subframe in a first transmission opportunity (TxOP); determine, at the UE based on the one or more UL grants, one or more UL subframes in at least one subsequent TxOP for an UL transmission from the UE; and process, at the UE, the UL transmission for communication on the one or more UL subframes in the at least one subsequent TxOP.

Example 2 includes the apparatus of Example 1, further comprising a transceiver configured to receive, from the eNodeB, the one or more UL grants on the DL subframe during the first TxOP.

Example 3 includes the apparatus of any of Examples 1 to 2, wherein the one or more UL grants are utilized by UEs that operate in an enhanced Licensed-Assisted Access (LAA) system, or in a MuLTEfire system that operates in an unlicensed spectrum without utilizing an anchor in a licensed spectrum.

Example 4 includes the apparatus of any of Examples 1 to 3, wherein the one or more processors and memory are further configured to decode TxOP scheduling information received in the DL subframe from the eNodeB, wherein the TxOP scheduling information is conveyed to the UE via a common physical downlink control channel (cPDCCH) or UL grant.

Example 5 includes the apparatus of any of Examples 1 to 4, wherein the one or more processors and memory are further configured to discard the TxOP scheduling information after a timeout period (N) resulting in the one or more UL grants being voided at the UE, wherein the timeout period (N) is received at the UE from the eNodeB using downlink control information (DCI).

Example 6 includes the apparatus of any of Examples 1 to 5, wherein the TxOP scheduling information indicates at least one of: a number of contiguous subframes for an UL transmission, an offset from a start of the first TxOP, a remaining number of subframes within the first TxOP, or a subframe ID associated with a subframe in the first TxOP.

Example 7 includes the apparatus of any of Examples 1 to 6, wherein the TxOP scheduling information indicates at least one of a start of the first TxOP or an end of the first TxOP.

Example 8 includes the apparatus of any of Examples 1 to 7, wherein the TxOP scheduling information indicates a TxOP identifier (ID) or toggling bits to enable the UE to detect the subsequent TxOP.

Example 9 includes the apparatus of any of Examples 1 to 8, wherein the one or more UL subframes in the at least one subsequent TxOP include consecutive UL subframes or distributed UL subframes.

Example 10 includes the apparatus of any of Examples 1 to 9, wherein the one or more UL grants enable cross TxOP scheduling in which the one or more UL subframes are scheduled in multiple subsequent TxOPs.

Example 11 includes an apparatus of an eNodeB operable to perform scheduling for a user equipment (UE), the apparatus comprising one or more processors and memory configured to: allocate, at the eNodeB, one or more uplink (UL) grants on a downlink (DL) subframe for the UE, wherein the one or more UL grants are allocated during a first transmission opportunity (TxOP), and the one or more UL grants schedule one or more UL subframes for the UE in at least one subsequent TxOP; and process, at the eNodeB, the one or more UL grants for transmission to the UE on the DL subframe during the first TxOP.

Example 12 includes the apparatus of Example 11, further comprising a transceiver configured to transmit, to the UE, the one or more UL grants on the DL subframe during the first TxOP.

Example 13 includes the apparatus of any of Examples 11 to 12, wherein the one or more processors and memory are further configured to process TxOP scheduling information for transmission in the DL subframe to the UE, wherein the TxOP scheduling information is conveyed to the UE via a common physical downlink control channel (cPDCCH) or UL grant.

Example 14 includes the apparatus of any of Examples 11 to 13, wherein the one or more processors and memory are further configured to process a timeout period (N) for transmission to the UE using downlink control information (DCI), wherein the TxOP scheduling information is discarded at the UE after the timeout period (N) resulting in the one or more UL grants being voided at the UE.

Example 15 includes the apparatus of any of Examples 11 to 14, wherein the TxOP scheduling information indicates at least one of: a number of contiguous subframes for an UL transmission, an offset from a start of the first TxOP, a remaining number of subframes within the first TxOP, or a subframe ID associated with a subframe in the first TxOP.

Example 16 includes the apparatus of any of Examples 11 to 15, wherein: the TxOP scheduling information indicates at least one of a start of the first TxOP or an end of the first TxOP; or the TxOP scheduling information indicates a TxOP identifier (ID) or toggling bits to enable the UE to detect the subsequent TxOP.

Example 17 includes the apparatus of any of Examples 11 to 16, wherein the one or more UL subframes in the subsequent TxOP include consecutive UL subframes or distributed UL subframes.

Example 18 includes the apparatus of any of Examples 11 to 17, wherein the one or more UL grants enable cross TxOP scheduling in which the one or more UL subframes are scheduled in multiple subsequent TxOPs.

Example 19 includes the apparatus of any of Examples 11 to 18, wherein the one or more processors and memory are further configured to process the one or more UL grants for transmission to UEs that operate in an enhanced Licensed-Assisted Access (LAA) system, or in a MuLTEfire system that operates in an unlicensed spectrum without utilizing an anchor in a licensed spectrum.

Example 20 includes at least one machine readable storage medium having instructions embodied thereon for processing scheduled uplink (UL) transmissions at a user equipment (UE), the instructions when executed by one or more processors perform the following: processing, at the UE, one or more uplink (UL) grants received from an eNodeB on a downlink (DL) subframe during a first transmission opportunity (TxOP), and the one or more UL grants schedule one or more UL subframes for the UE in at least one subsequent TxOP; and processing, at the UE, an UL transmission on the one or more UL subframes in the at least one subsequent TxOP in accordance with the one or more UL grants received from the eNodeB, wherein the UE operates in an enhanced Licensed-Assisted Access (LAA) system, or in a MuLTEfire system that operates in an unlicensed spectrum without utilizing an anchor in a licensed spectrum.

Example 21 includes the at least one machine readable storage medium of Example 20, further comprising instructions when executed by the one or more processors perform the following: decoding TxOP scheduling information received in the DL subframe from the eNodeB, wherein the TxOP scheduling information is conveyed to the UE via a common physical downlink control channel (cPDCCH) or UL grant.

Example 22 includes the at least one machine readable storage medium of any of Examples 20 to 21, further comprising instructions when executed by the one or more processors perform the following: discarding the TxOP scheduling information after a timeout period (N) resulting in the one or more UL grants being voided at the UE, wherein the timeout period (N) is received at the UE from the eNodeB using downlink control information (DCI).

Example 23 includes the at least one machine readable storage medium of any of Examples 20 to 22, wherein: the TxOP scheduling information indicates at least one of: a number of contiguous subframes for an UL transmission, an offset from a start of the first TxOP, a remaining number of subframes within the first TxOP, or a subframe ID associated with a subframe in the first TxOP; or the TxOP scheduling information indicates at least one of a start of the first TxOP or an end of the first TxOP; or the TxOP scheduling information indicates a TxOP identifier (ID) or toggling bits to enable the UE to detect the subsequent TxOP.

Example 24 includes the at least one machine readable storage medium of any of Examples 20 to 23, further comprising instructions when executed by the one or more processors perform the following: determining, at the UE, that a start of the subsequent TxOP has been missed by the UE, wherein the UE has transmitted a portion of UL data in the first TxOP; and determining that a previous subframe assignment is invalid; or processing a remaining portion of UL data for transmission in remaining UL subframes of the subsequent TxOP, and the UE is configured to wait for additional assigned subframe resources from the eNodeB.

Example 25 includes a user equipment (UE) operable to process scheduled uplink (UL) transmissions, the UE comprising: means for processing one or more uplink (UL) grants received from an eNodeB on a downlink (DL) subframe during a first transmission opportunity (TxOP), and the one or more UL grants schedule one or more UL subframes for the UE in at least one subsequent TxOP; and means for processing an UL transmission on the one or more UL subframes in the at least one subsequent TxOP in accordance with the one or more UL grants received from the eNodeB, wherein the UE operates in an enhanced Licensed-Assisted Access (LAA) system, or in a MuLTEfire system that operates in an unlicensed spectrum without utilizing an anchor in a licensed spectrum.

Example 26 includes the UE of Example 25, further comprising means for decoding TxOP scheduling information received in the DL subframe from the eNodeB, wherein the TxOP scheduling information is conveyed to the UE via a common physical downlink control channel (cPDCCH) or UL grant.

Example 27 includes the UE of any of Examples 25 to 26, further comprising means for discarding the TxOP scheduling information after a timeout period (N) resulting in the one or more UL grants being voided at the UE, wherein the timeout period (N) is received at the UE from the eNodeB using downlink control information (DCI).

Example 28 includes the UE of any of Examples 25 to 27, wherein: the TxOP scheduling information indicates at least one of: a number of contiguous subframes for an UL transmission, an offset from a start of the first TxOP, a remaining number of subframes within the first TxOP, or a subframe ID associated with a subframe in the first TxOP; or the TxOP scheduling information indicates at least one of a start of the first TxOP or an end of the first TxOP; or the TxOP scheduling information indicates a TxOP identifier (ID) or toggling bits to enable the UE to detect the subsequent TxOP.

Example 29 includes the UE of any of Examples 25 to 28, further comprising means for: determining, at the UE, that a start of the subsequent TxOP has been missed by the UE, wherein the UE has transmitted a portion of UL data in the first TxOP; and determining that a previous subframe assignment is invalid; or processing a remaining portion of UL data for transmission in remaining UL subframes of the subsequent TxOP, and the UE is configured to wait for additional assigned subframe resources from the eNodeB.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to process scheduled uplink (UL) transmissions, the apparatus comprising one or more processors and memory configured to:

process, at the UE, one or more uplink (UL) grants received from an eNodeB on a downlink (DL) subframe in a first transmission opportunity (TxOP);

determine, at the UE based on the one or more UL grants, one or more UL subframes in at least one subsequent TxOP for an UL transmission from the UE;

process, at the UE, the UL transmission for communication on the one or more UL subframes in the at least one subsequent TxOP; and decode, at the UE, TxOP scheduling information received in the DL subframe from the eNodeB, wherein the TxOP scheduling information indicates an explicit TxOP identifier (ID) to enable the UE to detect the subsequent TxOP, and wherein the TxOP scheduling information indicates at least one of a start of the first TxOP or an end of the first TxOP.

2. The apparatus of claim 1, further comprising a transceiver configured to receive, from the eNodeB, the one or more UL grants on the DL subframe during the first TxOP.

3. The apparatus of claim 1, wherein the one or more UL grants are utilized by the UE that operates in an enhanced Licensed-Assisted Access (LAA) system, or in a MuLTEfire system that operates in an unlicensed spectrum without utilizing an anchor in a licensed spectrum.

4. The apparatus of claim 1, wherein the TxOP scheduling information is conveyed to the UE via a common physical downlink control channel (cPDCCH) or UL grant.

5. The apparatus of claim 4, wherein the one or more processors and memory are further configured to discard the TxOP scheduling information after a timeout period (N) resulting in the one or more UL grants being voided at the UE, wherein the timeout period (N) is received at the UE from the eNodeB using downlink control information (DCI).

6. The apparatus of claim 4, wherein the TxOP scheduling information indicates at least one of: a number of contiguous subframes for an UL transmission, an offset from a start of the first TxOP, a remaining number of subframes within the first TxOP, or a subframe ID associated with a subframe in the first TxOP.

7. The apparatus of claim 1, wherein the one or more UL subframes in the at least one subsequent TxOP include consecutive UL subframes or distributed UL subframes.

8. The apparatus of claim 1, wherein the one or more UL grants enable cross TxOP scheduling in which the one or more UL subframes are scheduled in multiple subsequent TxOPs.

9. An apparatus of an eNodeB operable to perform scheduling for a user equipment (UE), the apparatus comprising one or more processors and memory configured to:
allocate, at the eNodeB, one or more uplink (UL) grants on a downlink (DL) subframe for the UE, wherein the one or more UL grants are allocated during a first transmission opportunity (TxOP), and the one or more UL grants schedule one or more UL subframes for the UE in at least one subsequent TxOP; and
process, at the eNodeB, the one or more UL grants for transmission to the UE on the DL subframe during the first TxOP; and
process TxOP scheduling information for transmission in the DL subframe to the UE, wherein the TxOP scheduling information indicates an explicit TxOP identifier (ID) to enable the UE to detect the subsequent TxOP, and wherein the TxOP scheduling information indicates at least one of a start of the first TxOP or an end of the first TxOP.

10. The apparatus of claim 9, further comprising a transceiver configured to transmit, to the UE, the one or more UL grants on the DL subframe during the first TxOP.

11. The apparatus of claim 9, wherein the TxOP scheduling information is conveyed to the UE via a common physical downlink control channel (cPDCCH) or UL grant.

12. The apparatus of claim 11, wherein the one or more processors and memory are further configured to process a timeout period (N) for transmission to the UE using downlink control information (DCI), wherein the TxOP scheduling information is discarded at the UE after the timeout period (N) resulting in the one or more UL grants being voided at the UE.

13. The apparatus of claim 11, wherein the TxOP scheduling information indicates at least one of: a number of contiguous subframes for an UL transmission, an offset from a start of the first TxOP, a remaining number of subframes within the first TxOP, or a subframe ID associated with a subframe in the first TxOP.

14. The apparatus of claim 11, wherein the one or more UL subframes in the subsequent TxOP include consecutive UL subframes or distributed UL subframes.

15. The apparatus of claim 11, wherein the one or more UL grants enable cross TxOP scheduling in which the one or more UL subframes are scheduled in multiple subsequent TxOPs.

16. The apparatus of claim 11, wherein the one or more processors and memory are further configured to process the one or more UL grants for transmission to UEs that operate in an enhanced Licensed-Assisted Access (LAA) system, or in a MuLTEfire system that operates in an unlicensed spectrum without utilizing an anchor in a licensed spectrum.

17. At least one non-transitory machine readable storage medium having instructions embodied thereon for processing scheduled uplink (UL) transmissions at a user equipment (UE), the instructions when executed by one or more processors perform the following:
processing, at the UE, one or more uplink (UL) grants received from an eNodeB on a downlink (DL) subframe during a first transmission opportunity (TxOP), and the one or more UL grants schedule one or more UL subframes for the UE in at least one subsequent TxOP;
processing, at the UE, an UL transmission on the one or more UL subframes in the at least one subsequent TxOP in accordance with the one or more UL grants received from the eNodeB,
wherein the UE operates in an enhanced Licensed-Assisted Access (LAA) system, or in a MuLTEfire system that operates in an unlicensed spectrum without utilizing an anchor in a licensed spectrum; and
decoding TxOP scheduling information received in the DL subframe from the eNodeB, wherein the TxOP scheduling information indicates an explicit TxOP identifier (ID) to enable the UE to detect the subsequent TxOP, and wherein the TxOP scheduling information indicates at least one of a start of the first TxOP or an end of the first TxOP.

18. The at least one non-transitory machine readable storage medium of claim 17, wherein the TxOP scheduling information is conveyed to the UE via a common physical downlink control channel (cPDCCH) or UL grant.

19. The at least one non-transitory machine readable storage medium of claim 18, further comprising instructions when executed by the one or more processors perform the following: discarding the TxOP scheduling information after a timeout period (N) resulting in the one or more UL grants being voided at the UE, wherein the timeout period (N) is received at the UE from the eNodeB using downlink control information (DCI).

20. The at least one non-transitory machine readable storage medium of claim 18, wherein
the TxOP scheduling information indicates at least one of: a number of contiguous subframes for an UL transmission, an offset from a start of the first TxOP, a remaining number of subframes within the first TxOP, or a subframe ID associated with a subframe in the first TxOP.

21. The at least one non-transitory machine readable storage medium of claim 17, further comprising instructions when executed by the one or more processors perform the following:
- determining, at the UE, that a start of the subsequent TxOP has been missed by the UE, wherein the UE has transmitted a portion of UL data in the first TxOP; and
- determining that a previous subframe assignment is invalid; or
- processing a remaining portion of UL data for transmission in remaining UL subframes of the subsequent TxOP, and the UE is configured to wait for additional assigned subframe resources from the eNodeB.

* * * * *